United States Patent [19]

Seki et al.

[11] Patent Number: 5,596,242

[45] Date of Patent: Jan. 21, 1997

[54] GUIDE DEVICE FOR VIBRATION DRIVEN MOTOR

[75] Inventors: Hiroyuki Seki, Urawa; Atsushi Kimura, Yokohama, both of Japan

[73] Assignee: Canon Kabushiki Kaisha, Tokyo, Japan

[21] Appl. No.: 261,887

[22] Filed: Jun. 17, 1994

Related U.S. Application Data

[63] Continuation of Ser. No. 936,777, Aug. 28, 1992, abandoned.

[30] Foreign Application Priority Data

Sep. 5, 1991 [JP] Japan ............................ 3-226047

[51] Int. Cl.$^6$ ............................................. H02N 2/04
[52] U.S. Cl. ................................................. 310/328
[58] Field of Search ................................. 310/323, 328

[56] References Cited

U.S. PATENT DOCUMENTS

| | | | |
|---|---|---|---|
| 3,246,608 | 4/1966 | Cooper | 310/328 |
| 4,613,782 | 9/1986 | Mori et al. | 310/323 |
| 4,672,256 | 6/1987 | Okuno et al. | 310/323 |
| 4,692,651 | 9/1987 | Hiramatsu et al. | 310/323 |
| 4,752,711 | 6/1988 | Tsukimoto et al. | 310/323 |
| 4,786,836 | 11/1988 | Tokushima | 310/323 |
| 5,013,958 | 5/1991 | Ohnishi et al. | 310/323 |
| 5,049,775 | 9/1991 | Smits | 310/328 |
| 5,089,740 | 2/1992 | Ono | 310/328 |
| 5,128,580 | 7/1992 | Maeno et al. | 310/323 |
| 5,134,335 | 7/1992 | Ikemoto et al. | 310/328 |
| 5,140,214 | 8/1992 | Kimura et al. | 310/323 |
| 5,155,407 | 12/1992 | Kimura et al. | 310/323 |
| 5,180,941 | 1/1993 | Seki et al. | 310/323 |

FOREIGN PATENT DOCUMENTS

| | | | |
|---|---|---|---|
| 0437050 | 7/1991 | European Pat. Off. | H01L 41/00 |
| 62-077969 | 4/1987 | Japan | B41J 23/00 |
| 62-107685 | 5/1987 | Japan | 310/328 |
| 63-244205 | 11/1988 | Japan | 310/328 |
| 1-303361 | 12/1989 | Japan | 310/323 |
| 3-089875 | 4/1991 | Japan | H02N 2/00 |
| 3-155375 | 4/1991 | Japan | H02N 2/00 |

OTHER PUBLICATIONS

European Search Report dated Mar. 21, 1995.

*Primary Examiner*—Thomas M. Dougherty
*Attorney, Agent, or Firm*—Fitzpatrick, Cella, Harper & Scinto

[57] ABSTRACT

A vibration driven motor includes guide grooves formed in two side surfaces of a rail shaped stator along a prospective moving direction, and a pair of first roller bearings to be fitted in one guide groove and arranged at front and rear portions in the moving direction of one side surface of a movable base operatively fixed to a vibrator. A second roller bearing is fitted in the other guide groove and arranged to be located between the first roller bearings. A first urging member engages the first guide follower, for urging the first guide follower to follow the first guide surface, and a second urging member engages the second guide follower, for urging the second guide follower to follow the second guide surface.

19 Claims, 5 Drawing Sheets

GUIDE DEVICE FOR VIBRATION DRIVEN MOTOR

This application is a continuation of application Ser. No. 07/936,777 filed Aug. 28, 1992 now abandoned.

BACKGROUND OF THE INVENTION

1. Field of the Invention

The present invention relates to a vibration driven motor and, more particularly, to a linear shaped vibration wave driven motor for urging an elastic member in which a travelling wave is formed against a rail shaped stator, and moving the elastic member along the rail shaped stator.

2. Related Background Art

As a conventional linear shaped vibration driven motor of this type, a motor shown in FIGS. 6 and 7 is known.

An elliptic metal elastic member 1 has a projection 1a formed on the sliding surface side, and a piezo-electric element 2 is bonded on the upper surface of the elastic member, thus forming a vibrator. When an AC voltage is applied to the piezo-electric element 2, a travelling vibration wave is formed. The generation principle of the travelling vibration wave and the structure of the piezo-electric element 2 are known to those who are skilled in the art, and a detailed description thereof will be omitted. Briefly speaking, when AC voltages having 90° time phases are applied to two groups of driving piezo-electric elements, which are positionally shifted by 90°, of the piezo-electric element, a travelling vibration wave is formed. A rail shaped stator 8 is in frictional contact with the elastic member 1. The stator 8 is fixed to a bottom plate 10 of a motor case, and is in contact with the elastic member 1 by a compression spring 3 through a vibration insulating member (e.g., felt) 5. A planar supporting plate 6 is fixed to the elastic member 1. The central portion of the supporting plate 6 is fixed by a block shaped 10 supporting member 7, and the supporting plate 6 supports the elastic member 1.

The elastic member 1 is supported on a base 4 through the supporting plate 6 and the supporting member 7, and the base 4 is supported by restriction members 9 for restricting displacements other than that in a prospective moving direction $B_Y$.

When a travelling vibration wave is formed in the elastic member 1, the elastic member 1 is moved along the rail shaped stator 8 by the frictional force between the rail shaped stator 8 and the elastic member 1, and the base 4, and other members 3, 5, 6, and 7 are moved in the direction By along the restriction members 9 accordingly. The frictional driving force generated in this case is applied on a portion of the elastic member 1, and is shifted from the supporting portion. For this reason, a moment acts on the elastic member 1, and the elastic member 1 is forced to shift in the directions $B_X$ and $B_Y$.

The supporting plate 6 has an X shape, as shown in FIG. 8, and its four distal ends are joined to the inner side surfaces of the elastic member 1 by, e.g., spot welding. The central portion of the supporting plate 6 is rigidly clamped by the supporting member 7, and the supporting member 7 is fixed to the base 4. For this reason, even when the moment acts on the elastic member 1, the elastic member 1 can be smoothly linearly moved together with the base 4 without being rotated or cluttering.

Since this motor can perform position control of an intermittent driving operation with high precision, it is proposed to use the motor as a print head driving source in, e.g., a thermal jet printer. The print head is mounted on a carriage (not shown) attached to the base 4, and is linearly and reciprocally moved.

However, in the above-mentioned prior art, since the rail shaped stator 8 and the restriction members 9 are separately formed, and are elongated in the direction $B_y$, the rail shaped stator and the restriction members can deform considerably. For this reason, it is difficult to form the rail sliding surface and the carriage guide portion of the restriction members with a high degree of precision and flatness.

Furthermore, since the bottom plate 10 attached with these rail shaped stator and restriction members is a thin plate, it can deform considerably (e.g., warps). When the restriction members 9 and the rail shaped stator 8 are attached to this bottom plate, deformation of these members is worse.

For this reason, the parallelness of the carriage guide surfaces of the two restriction members 9 is impaired, and the inclination of the carriage locally changes upon movement of the carriage in the direction $B_Y$. As a result, the gap between the rail sliding surface and the carriage also changes.

As described above, since the elastic member 1 is attached to the carriage through the supporting member, and the compression spring 3 is also attached to the carriage, when the gap between the rail sliding surface and the carriage locally changes in the direction $B_y$, the compression force to be applied to the elastic member 1 varies. Thus, a stable driving force for the motor cannot be obtained. When the inclination of the carriage locally changes, since the vibrator is inclined accordingly, a contact state between the rail sliding surface and the vibrator deteriorates, thus reducing motor performance.

SUMMARY OF THE INVENTION

One aspect of the present invention is to provide a high-precision linear shaped vibration driven motor, which comprises a moving body moved integrally with a vibrator, and a rail shaped stator contacting the vibrator, and having horizontal and vertical guide grooves, and capable of eliminating a variation in compression force of the vibrator, and an unstable contact state of a sliding portion.

DESCRIPTION OF THE PREFERRED EMBODIMENTS

Figure 1:
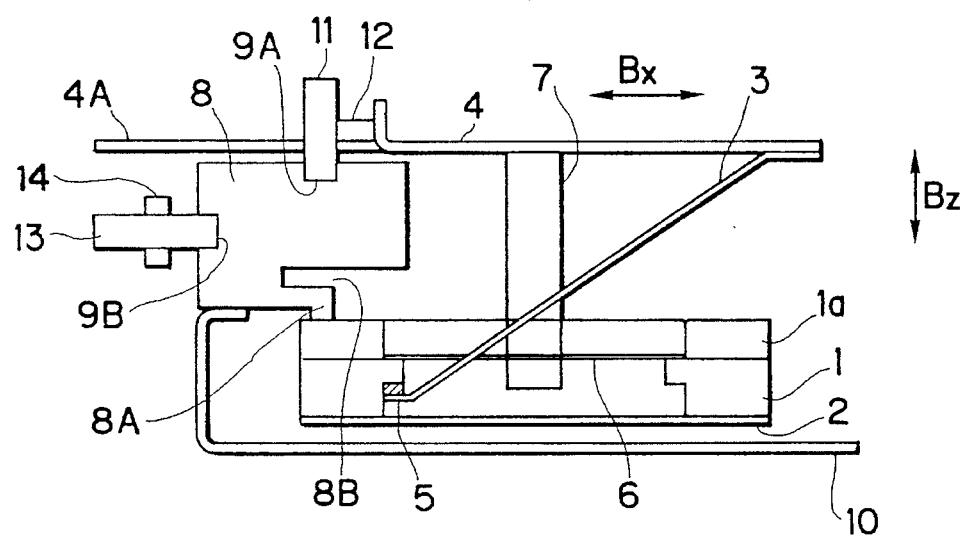
FIG. 1 is a side view showing the first embodiment of a linear shaped vibration driven motor according to the present invention.
Figure 2:
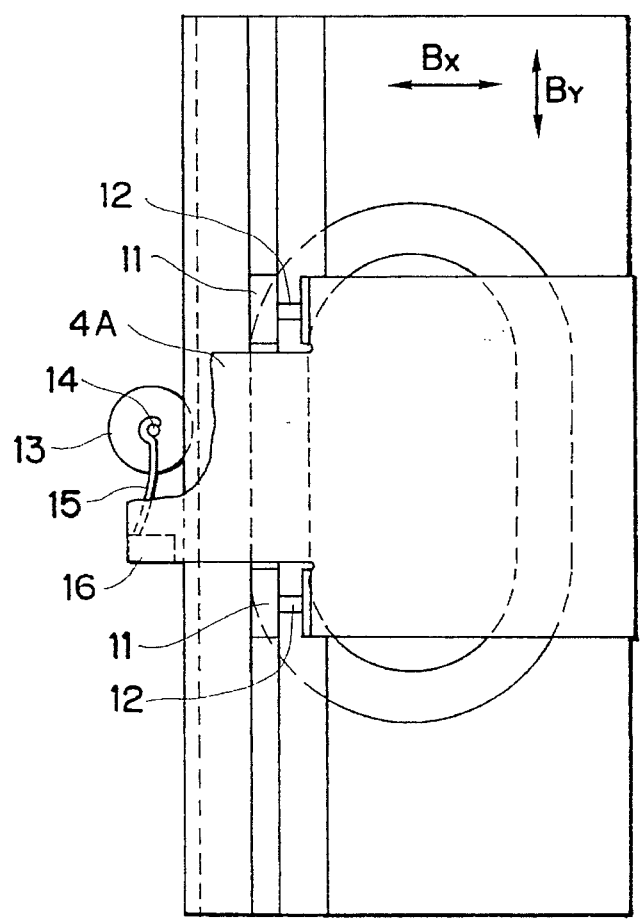
FIG. 2 is a partially cutaway plan view of FIG. 1.

FIGS. 1 and 2 are respectively a sectional view and a partially cutaway plan view showing the first embodiment of a linear shaped vibration driven motor according to the present invention.

A vibrator used in this embodiment is prepared by bonding a piezo-electric element 2 as an electro-mechanical energy conversion element on one surface of an elliptic elastic member 1 like in the prior art. A large number of comb shaped projections (not shown) are formed on a driving surface of the elastic member, opposite the side of the piezo-electric element 2, in the travelling direction of a travelling wave. A supporting plate 6 is joined between opposing linear portions of the elastic member 1 by joining means such as spot welding. The lower end portion of a supporting member 7 depending from a base 4 located above the supporting plate 6 is attached to the supporting plate 6, thus integrally assembling the base 4 and the vibrator. A compression leaf spring 3 is obliquely arranged between the base 4 and the elastic member 1, as shown in FIG. 1. The linear driving portion of the elastic member 1 to be driven is pressed against a rail portion 8A of a rail shaped stator 8 (to be described below) by the biasing force of the compression spring 3 through a vibration insulating member 5 such as a felt interposed between the lower end portion of the compression spring 3 and the elastic member 1.

Guide grooves 9A and 9B are respectively formed in the upper surface and the outer side surface of the rail shaped stator 8 of this embodiment along the longitudinal direction. The rail portion 8A having proper elasticity is formed by a lateral groove 8B on the lower surface portion of the rail shaped stator 8.

A bridge portion 4A is formed on one side of the base 4 to extend over the rail shaped stator 8, and shaft rods 12 are fixed to the front and rear portions of one side surface of the base 4. Roller bearings 11, whose displacements in a direction $B_Y$ are restricted, are rotatably attached to the distal ends of the shaft rods 12 to be fitted in the guide groove 9A.

A roller compression spring 15 is attached to the bridge portion 4A of the base 4 through a spring supporting plate 16. A shaft rod 14 is fixed to the distal end of the roller compression spring 15. A roller bearing 13, whose displacement in a direction $B_Z$ is restricted, is rotatably attached to the shaft rod 14 to be fitted in the guide groove 9B, and is biased by the biasing force of the spring 15 in a direction $B_X$ different from the direction $B_Y$ by 90°, thereby preventing cluttering of the base 4 in the direction $B_X$.

When a high-frequency voltage of about 30 kHz is applied from a power supply (not shown) to the piezo-electric element 2, a traveling vibration wave is excited in the elastic member 1 by known principles, and the elastic member 1, the base 4, and the members (3, 5, 6, 7, 11, 12, 13, 14, 15, and 16) attached to the base 4 are moved in the direction $B_Y$ along the guide grooves 9A and 9B provided to the rail shaped stator 8 by the frictional force between the elastic member 1 and the rail shaped stator 8.

At this time, the roller bearing 11 is engaged with the groove 9A having a width slightly wider than that of the roller bearing, and rolls along the groove 9A. Since the roller bearing 13 is biased in the direction $B_X$ by the spring 15, the roller bearing 11 rolls while being pressed against one inner side surface of the groove 9A. Thus, the base 4 can be smoothly moved in the direction $B_Y$ without cluttering in the direction $B_X$.

In the above embodiment, the elastic member 1 is moved. Alternatively, the vibrator including the elastic member 1 and the piezo-electric element 2 may be fixed, and the stator 8 may be movably arranged, thus obtaining the same effect as described above. In this case, of course, the supporting member 7 is engaged with the stator 8, and the base 4 is engaged with the supporting member 7. When a print head is arranged on the base 4, the present invention can be constituted as a printer.

Figure 3:
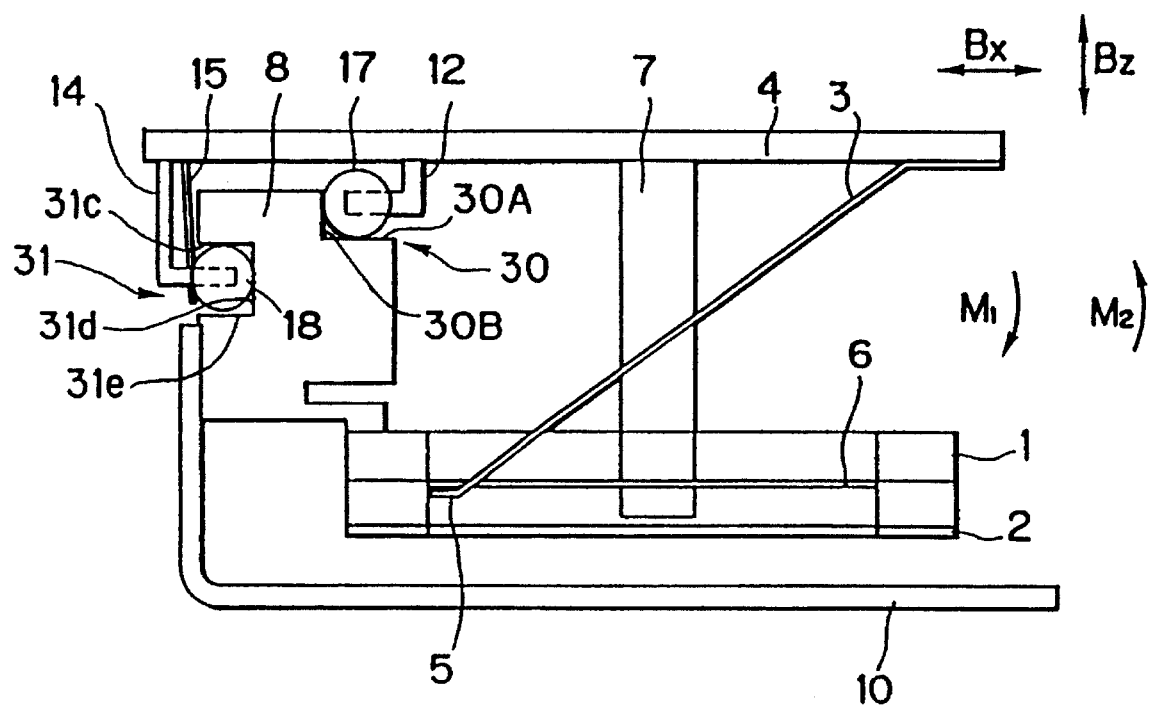
FIG. 3 is a sectional view of the second embodiment.

FIG. 3 shows the second embodiment.

In the first embodiment described above, the roller bearings 11 and 13 are fitted in the guide grooves 9A and 9B. In this embodiment, in place of the roller bearings, first ball shaped roller bearings 17, and a second ball shaped roller bearing 18 are arranged. A notched portion 30 having an L shaped section to be engaged with the first ball shaped roller bearings 17 is formed in the inner side surface of the upper portion of the rail shaped stator 8, and a recessed groove 31 in which the second ball shaped roller bearing 18 is fitted to have a small gap is formed in the side surface opposite to the notched portion. The rail shaped stator 8 is clamped in a direction $B_X$ between the two first ball shaped roller bearings 17 arranged in the back-and-forth direction (a direction $B_Y$), and the second ball shaped roller bearing 18. The second ball shaped roller bearing 18 is urged against an inner wall surface 31d of the recessed groove 31 by a compression spring 15, and the first ball shaped roller bearings 17 are urged against a guide surface 30A of the notched portion 30 by a reaction force of the biasing force of a compression spring 3. Since a moment in a direction $M_1$ in FIG. 3 acts by the weight of a base 4, an elastic member 1, and the like, the roller bearing 18 is urged against a guide surface 31c, thus maintaining the position of the base 4.

Since the roller bearing 18 is biased in the direction $B_X$ by the compression spring 15, and is urged against the guide surface 31d, the degree of freedom of the base 4 in the direction $B_X$ is restricted by a guide surface 30B through the roller bearings 17.

When a high-frequency voltage is applied from a power supply (not shown) to the piezo-electric element 2, and a traveling vibration wave is excited in the elastic member 1, the elastic member 1 and the base 4 can be smoothly and reciprocally driven in the direction $B_Y$ without cluttering in the directions $B_X$ and $B_Z$ by the guide surfaces 30A, 30B, and 31c to 31e.

Figure 4:
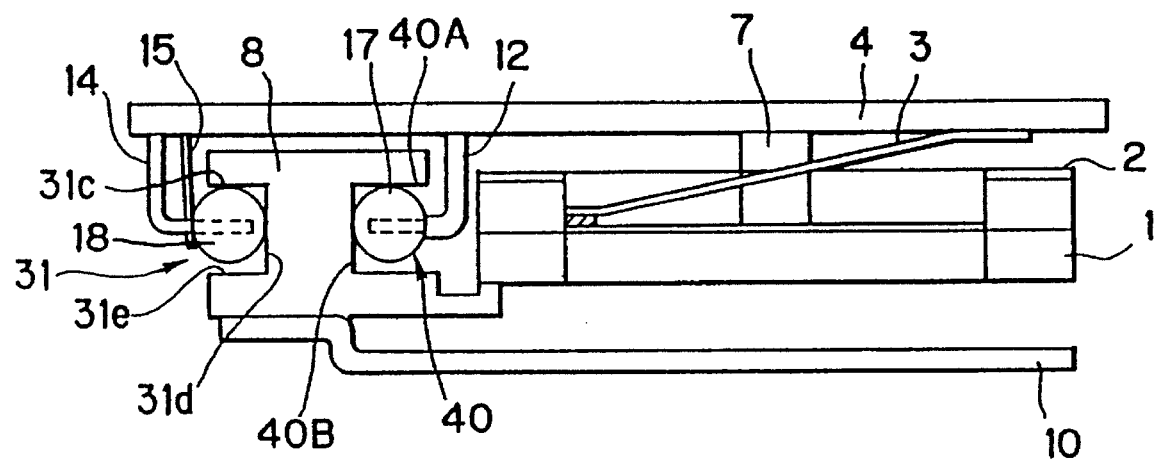
FIG. 4 is a sectional view of the third embodiment.

FIG. 4 shows the third embodiment of a linear shaped vibration driven motor according to the present invention.

In this embodiment, contrary to the above embodiment, a vibrator is formed with a driving surface facing down, and a rail surface is formed facing up on the lower portion of a rail shaped stator 8. Like in the second embodiment, first ball shaped roller bearings 17 and a second ball shaped roller bearing 18 are provided to a base 4, and the second ball shaped roller bearing 18 is fitted in a recessed groove 31 of the rail shaped stator 8. The first ball shaped roller bearings 17 are fitted in a similar groove 40 to have a small gap, and contact guide surfaces 40A and 40B formed on the inner wall surfaces of the groove 40.

In this embodiment, as in the second embodiment, the outer diameter of the second ball shaped roller bearing 18 is formed to be slightly smaller than the opening width of the recessed groove 31, and when the roller bearing 18 contacts a surface 31c, it is slightly separated from a surface 31e. For this reason, even when a moment $M_2$ acts, the base 4 is not inclined in the direction $M_2$, and the second roller bearing 18 contacts the guide surface 31e to maintain the position of the base 4.

Shaft rods 12 and 14 do not extend through the first and second ball shaped roller bearings 17 and 18. Therefore, contact surfaces between the first and second ball shaped roller bearings 17 and 18 and the guide surfaces are smooth spherical surfaces.

Figure 5:
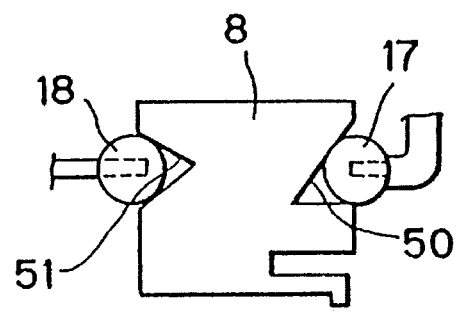
FIG. 5 is a sectional view of the fourth embodiment.
Figure 6:
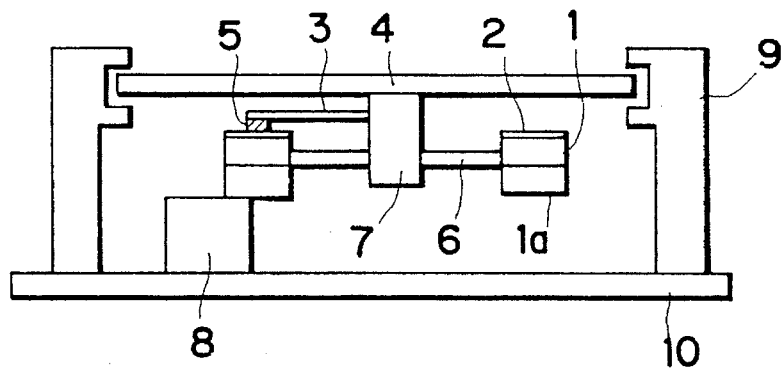
FIG. 6 is a sectional view of a conventional linear shaped vibration driven motor.
Figure 7:
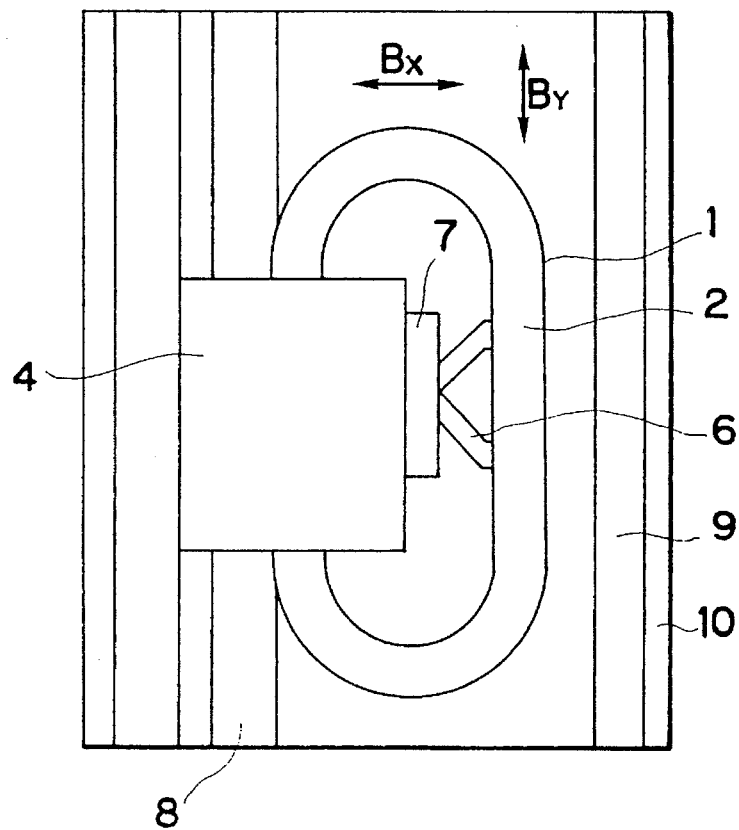
FIG. 7 is a plan view of FIG. 6.
Figure 8:
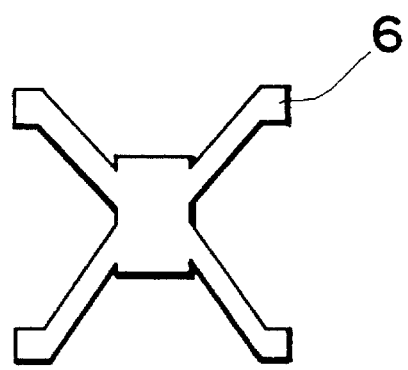
FIG. 8 is a plan view of a supporting plate shown in FIG. 6.

FIG. 5 shows the fourth embodiment of a linear shaped vibration driven motor according to the present invention. FIG. 5 illustrates only a rail shaped stator 8.

In the second or third embodiment described above, the first and second ball shaped roller bearings 17 and 18 are fitted in grooves having a recess shaped section or a notched portion having an L shaped section. In this embodiment, these roller bearings are fitted in groove portions 50 and 51 each having a wedge shaped section.

As described above, according to the present invention, the constant compression force of the vibrator can be maintained without being influenced by a warp of the bottom plate or the rail, and a stable motor output can be obtained.

What is claimed is:

1. A vibration driven motor comprising:

a vibration member comprising a contact portion, and responsive to an applied electrical signal for generating a vibration therein;

a contact member having a contact portion which is in contact with the contact portion of said vibration member, the vibration generated in said vibration member effecting relative movement between said vibration member and said contact member, said contact member including a first guide surface and a second guide surface, said contact portion, said first guide surface and said second guide surface being integrally formed on a single body;

first and second guide followers functionally engaged to said vibration member, said first guide follower engaging said first guide surface, for preventing the contact member from shifting in a horizontal direction, and said second guide follower engaging said second guide surface, for preventing the contact member from shifting in a vertical direction; and first and second urging members, said first urging member engaging said first guide follower, to urge said first guide follower to follow the first guide surface, and said second urging member engaging said second guide follower, to urge said second guide follower to follow the second guide surface;

wherein each of said first and second guide surfaces of said contact member includes a recess engageable with a corresponding one of said first and second guide followers.

2. A vibration driven motor according to claim 1, wherein each of said first and second guide followers includes a roller bearing fixed at a predetermined position.

3. A vibration driven motor according to claim 1, said first urging member comprising:

a biasing member for biasing said first guide follower against said first guide surface.

4. A vibration driven motor according to claim 3, wherein said biasing member includes a spring engageable with said first guide follower.

5. A vibration driven motor according to claim 1, wherein each of said first and second guide followers includes a respective ball shaped roller bearing arranged at a predetermined position.

6. A vibration driven motor comprising:

a vibration member comprising a contact portion, and responsive to an applied electrical signal for generating a vibration therein;

a contact member having a contact portion which is in contact with the contact portion of said vibration member, the vibration generated in said vibration member effecting relative movement between said vibration member and said contact member, said contact member including a first guide surface and a second guide surface;

first and second guide followers functionally engaged to said vibration member, said first guide follower engaging said first guide surface, for preventing the contact member from shifting in a horizontal direction, and said second guide follower engaging said second guide surface, for preventing the contact member from shifting in a vertical direction; and first and second urging members, said first urging member engaging said first guide follower, to urge said first guide follower to follow the first guide surface, and said second urging member engaging said second guide follower, to urge said second guide follower to follow the second guide surface;

wherein each of said first and second guide surfaces of said contact member includes a recess engageable with a corresponding one of said first and second guide followers.

7. A vibration driven motor comprising:

a vibration member comprising a contact portion, and responsive to an applied electrical signal for generating a vibration therein;

a contact member having a contact portion which is in contact with the contact portion of said vibration member, the vibration generated in said vibration member effecting relative movement between said vibration member and said contact member, said contact member including a first guide surface and a second guide surface;

first and second guide followers functionally engaged to said vibration member, said first guide follower engaging said first guide surface, for preventing the contact member from shifting in a horizontal direction, and said second guide follower engaging said second guide surface, for preventing the contact member from shifting in a vertical direction; and first and second urging members, said first guide member engaging said first guide follower, to urge said first guide follower to follow the first guide surface, and said second urging member engaging said second guide follower, to Urge said second guide follower to follow the second guide surface;

wherein each of said first and second guide surfaces of said contact member includes a wedge shaped groove engageable with a corresponding one of said first and second guide followers.

8. A vibration driven actuator comprising:

a vibration member comprising a contact portion, and responsive to an applied electrical signal for generating a vibration therein;

a contact member having a contact portion which is in contact with the contact portion of said vibration member, the vibration generated in said vibration member effecting relative movement between said vibration member and said contact member, said contact member including a first guide surface and a second guide surface, said contact portion, said first guide surface and said second guide surface being integrally formed on a single body;

first and second guide followers, functionally engaged to said vibration member, said first guide follower engaging said first guide surface, for preventing the contact member from shifting in a first direction, and said second guide follower engaging said second guide surface, for preventing the contact member from shifting in a second direction different from said first direction; and first and second urging members, said first urging member engaging said first guide follower, to urge said first guide follower to follow the first guide surface, and said second urging member engaging said second guide follower, to urge said second guide follower to follow the second guide surface;

wherein each of said first and second guide surfaces of said contact member includes a recess engagable with a corresponding one of said first and second guide followers.

9. A vibration driven motor according to claim 8, wherein each of said first and second guide followers includes rollers at predetermined positions.

10. A vibration driven motor according to claim 8, said first urging member comprising:

a biasing member for biasing said first guide follower against said first guide surface.

11. A vibration driven motor according to claim 10, wherein said biasing member includes a spring engagable with said first guide follower.

12. A vibration driven motor according to claim 8, wherein each of said first and second guide followers includes a respective ball shaped roller bearing arranged at a predetermined position.

13. A vibration driven actuator comprising:

a vibration member comprising a contact portion, and responsive to an applied electrical signal for generating a vibration therein;

a contact member comprising a contact portion in contact with the contact portion of said vibration member, the vibration generated in said vibration member effecting relative movement between said vibration member and said contact member, and a single rail having a first guide surface and a second guide surface, said contact portion, said first guide surface and said second guide surface being integrally formed on a single body; and first and second guide followers, functionally engaged with said vibration member, said first guide follower engaging said first guide surface, for preventing the contact member from shifting in a first direction, and said second guide follower engaging said second guide surface, for preventing the contact member from shifting in a second direction;

wherein each of said first and second guide surfaces of said contact member includes a recess engagable with a corresponding one of said first and second guide followers.

14. A vibration driven actuator comprising:

a vibration member comprising a contact portion, and responsive to an applied electrical signal for generating a vibration therein;

a contact member having a contact portion which is in contact with the contact portion of said vibration member, the vibration generated in said vibration member effecting relative movement between said vibration member and said contact member, said contact member including a first guide surface and a second guide surface;

first and second guide followers, functionally engaged to said vibration member, said first guide follower engaging said first guide surface, for preventing the contact member from shifting in a first direction, and said second guide follower engaging said second guide surface, for preventing the contact member from shifting in a second direction different from said first direction; and first and second urging members, said first urging member engaging said first guide follower, to urge said first guide follower to follow the first guide surface, and said second urging member engaging said second guide follower, to urge said second guide follower to follow the second guide surface;

wherein each of said first and second guide surfaces of said contact member includes a wedge shaped groove engageable with a corresponding one of said first and second guide followers.

15. A vibration driven system comprising:

a vibration member comprising a contact portion, and responsive to an applied electrical signal for generating a vibration therein;

a contact member having a contact portion which is in contact with the contact portion of said vibration member, the vibration generated in said vibration member effecting relative movement between said vibration member and said contact member, said contact member including a first guide surface and a second guide surface, said contact portion, said first guide surface and said second guide surface being integrally formed on a single body;

first and second guide followers, functionally engaged to said vibration member, said first guide follower engaging said first guide surface, for preventing the contact member from shifting in a horizontal direction, and said second guide follower engaging said second guide surface, for preventing the contact member from shifting in a vertical direction;

first and second urging members, said first urging member engaging said first guide follower, to urge said first guide follower to follow the first guide surface, and said second urging member engaging said second guide follower, to urge said second guide follower to follow the second guide surface; and a movable member engaged with one of said contact member and said vibration member;

wherein each of said first and second guide surfaces of said contact member includes a recess engagable with a corresponding one of said first and second guide followers.

16. A vibration driven system according to claim 15, wherein said movable member forms a base for placing a print head of a printer thereon.

17. A vibration driven printer comprising:

a vibration member comprising a contact portion, and responsive to an applied electrical signal for generating a vibration therein;

a contact member having a contact portion which is in contact with the contact portion of said vibration member, the vibration in said vibration member effecting relative movement between said vibration member and said contact member, said contact member including a first guide surface and a second guide surface, said contact portion, said first guide surface and said second guide surface being integrally formed on a single body;

a carriage member for supporting a printer head of a printer, and including first and second guide followers, said first guide follower engaging said first guide surface, for preventing the contact member from shifting in a first direction, and said second guide follower engaging said second guide surface, for preventing the contact member from shifting in a second direction; and first and second urging members, said first urging member engaging said first guide follower, to urge said first guide follower to follow the first guide surface, and said second urging member engaging said second guide follower, to urge said second guide follower to follow the second guide surface;

wherein each of said first and second guide surfaces of said contact member includes a recess engagable with a corresponding one of said first and second guide followers.

18. A vibration driven actuator, comprising:

a loop shaped vibrating member for generating a travelling wave therein, the vibrating member including at least one straight portion having a contact surface;

a contact member having a contact surface which is in contact with the contact surface of said vibrating member, the travelling wave generated in said vibration member causing relative movement between said vibrating member and said contact member, said contact members including a first guide surface and a second guide surface, said contact portion, said first guide surface and said second guide surface being integrally formed on a single body;

a sliding member functionally engaged with said vibrating member, including first and second guide followers, said first guide follower engaging said first guide surface, for preventing the contact member from shifting in a horizontal direction, and said second guide follower engaging said second guide surface, for preventing the contact member from shifting in a vertical direction; and first and second urging members, said first urging member engaging said first guide follower, to urge said first guide follower to follow the first guide surface, and said second urging member engaging said second guide follower, to urge said second guide follower to follow the second guide surface;

wherein each of said first and second guide surfaces of said contact member includes a recess engagable with a corresponding one of said first and second guide followers.

19. A vibration driven motor comprising:

a vibration member comprising a contact portion, and responsive to an applied electrical signal for generating a vibration therein;

a contact member comprising a contact portion in contact with the contact portion of said vibration member, the vibration generated in said vibration member effecting relative movement between said vibration member and said contact member, and a single rail including a first guide surface and a second guide surface, said contact portion, said first guide surface and said second guide surface being integrally formed on a single body; and first and second guide followers, functionally engaged with said vibration member, said first guide follower engaging said first guide surface, for preventing the contact member from shifting in a horizontal direction, and said second guide follower engaging said second guide surface, for preventing the contact member from shifting in a vertical direction;

wherein each of said first and second guide surfaces of said contact member includes a recess engagable with a corresponding one of said first and second guide followers.

* * * * *

UNITED STATES PATENT AND TRADEMARK OFFICE
CERTIFICATE OF CORRECTION

PATENT NO. : 5,596,242
DATED : January 21, 1997
INVENTOR(S) : HIROYUKI SEKI, ET AL.

It is certified that error appears in the above-indentified patent and that said Letters Patent is hereby corrected as shown below:

COLUMN 1

Line 48, "By" should read --$B_Y$--.

COLUMN 2

Line 13, "warps)." should read --warp).--.

Signed and Sealed this

Twenty-seventh Day of May, 1997

Attest:

BRUCE LEHMAN

Attesting Officer

Commissioner of Patents and Trademarks